· US009529422B2

(12) United States Patent
Kobayashi et al.

(10) Patent No.: US 9,529,422 B2
(45) Date of Patent: Dec. 27, 2016

(54) IMAGE DISPLAY AND PHOTOGRAPHING SYSTEM, PHOTOGRAPHING DEVICE, DISPLAY DEVICE, IMAGE DISPLAY AND PHOTOGRAPHING METHOD, AND COMPUTER-READABLE STORAGE MEDIUM FOR COMPUTER PROGRAM

(71) Applicant: KONICA MINOLTA, INC., Chiyoda-ku, Tokyo (JP)

(72) Inventors: Yuji Kobayashi, Toyohashi (JP); Harumitsu Fujimori, Machida (JP); Akihiro Hayashi, Okazaki (JP); Shiro Umeda, Toyokawa (JP); Kosuke Masumoto, Hachioji (JP); Yasuhiro Ishihara, Toyohashi (JP); Hiroshi Yamaguchi, Toyokawa (JP); Isao Watanabe, Toyohashi (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 81 days.

(21) Appl. No.: 14/706,418

(22) Filed: May 7, 2015

(65) Prior Publication Data

US 2015/0324005 A1    Nov. 12, 2015

(30) Foreign Application Priority Data

May 9, 2014    (JP) .................. 2014-097556

(51) Int. Cl.
*G06F 3/041* (2006.01)
*G06F 3/01* (2006.01)
(Continued)

(52) U.S. Cl.
CPC ................. *G06F 3/01* (2013.01); *G06F 3/017* (2013.01); *G06F 3/0425* (2013.01);
(Continued)

(58) Field of Classification Search
CPC .... G06F 3/04865; G06F 3/0487; G06F 3/044; G06F 3/045
(Continued)

(56) References Cited

U.S. PATENT DOCUMENTS 5,528,263 A * 6/1996 Platzker .................. G06F 3/011
                                                345/156
2004/0021645 A1 * 2/2004 Kobayashi ............ G06F 3/0433
                                                345/173

(Continued)

FOREIGN PATENT DOCUMENTS

| JP | 2004-252118 A | 9/2004 |
| JP | 2005-242725 A | 9/2005 |
| JP | 2011-107237 A | 6/2011 |

*Primary Examiner* — Kimnhung Nguyen
(74) *Attorney, Agent, or Firm* — Buchanan Ingersoll & Rooney PC

(57) ABSTRACT

An image display and photographing system includes a display device configured to display a target image on a surface; a photographing device configured to photograph the surface; a first detector configured to detect that an object moves away from a space between the surface and the photographing device; a second detector configured to detect that, after the first detector detects that the object moves away from the space, the surface is touched at a predetermined position; a third detector configured to detect that, after the second detector detects that the surface is touched at the predetermined position, the object moves away from the space; and a photographing control portion configured to control, after the third detector detects that the object moves away from the space, the photographing device to photograph the surface.

14 Claims, 16 Drawing Sheets

(51) Int. Cl.
*G06F 3/042* (2006.01)
*G06F 3/0488* (2013.01)
*H04N 5/232* (2006.01)
*H04N 9/31* (2006.01)

(52) U.S. Cl.
CPC ........... *G06F 3/0488* (2013.01); *H04N 5/232* (2013.01); *H04N 9/3179* (2013.01); *H04N 9/3194* (2013.01)

(58) Field of Classification Search
USPC .................................. 345/156–158, 173–180
See application file for complete search history.

(56) References Cited

U.S. PATENT DOCUMENTS

| | | |
|---|---|---|
| 2007/0159453 A1 | 7/2007 | Inoue |
| 2011/0074674 A1* | 3/2011 | Walberg ................ G06F 3/0418 345/158 |
| 2011/0128555 A1* | 6/2011 | Rotschild ........... G02B 27/2271 356/625 |
| 2012/0075206 A1* | 3/2012 | Yuzawa .................. G06F 3/011 345/173 |
| 2012/0313865 A1* | 12/2012 | Pearce .................. G06F 3/0416 345/173 |
| 2014/0026076 A1* | 1/2014 | Jacob .................... G06F 3/0418 715/757 |
| 2014/0085184 A1* | 3/2014 | Vertegaal ................ G06F 3/017 345/156 |
| 2014/0129990 A1* | 5/2014 | Xin ...................... G06K 9/6201 715/849 |
| 2014/0320457 A1* | 10/2014 | Chen .................... G06F 3/0416 345/175 |
| 2014/0380193 A1* | 12/2014 | Coplen ............... G06F 3/04847 715/753 |

\* cited by examiner

OBJECT IS PRESENT IN PHOTOGRAPHIC SPACE.

OBJECT IS NOT PRESENT IN PHOTOGRAPHIC SPACE.

FIG. 8
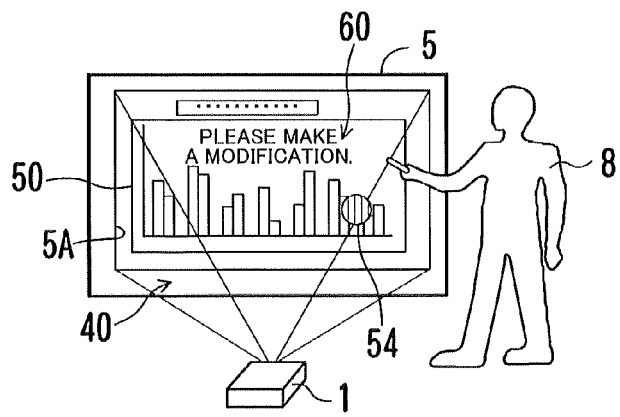
(A)
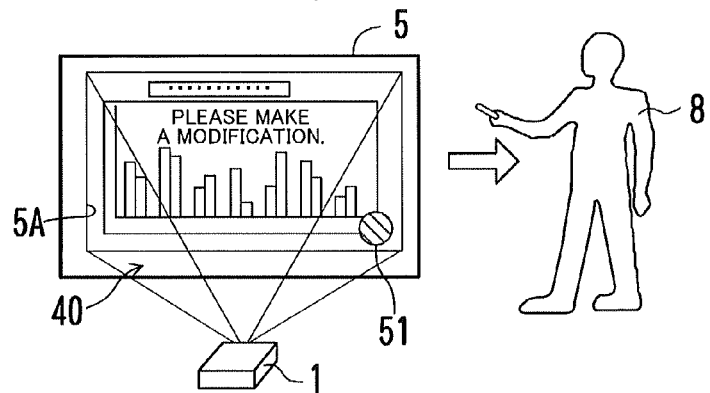
(B)
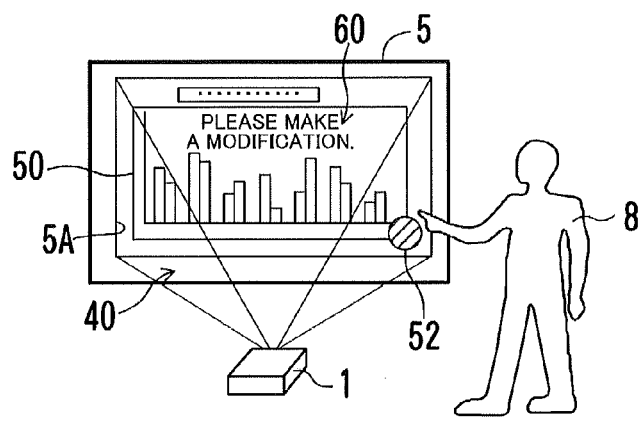
(C)
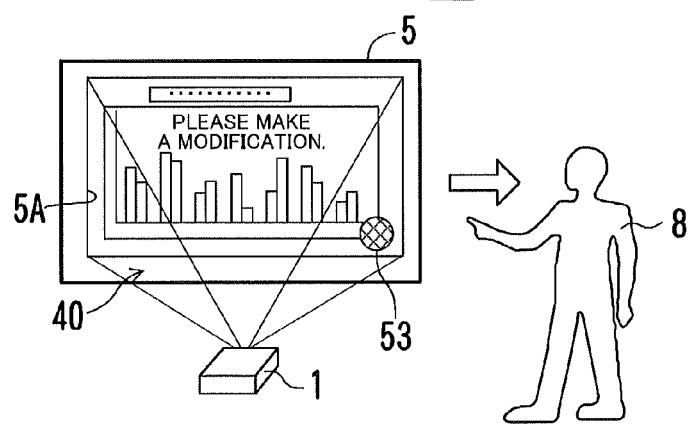
(D)

FIG. 9
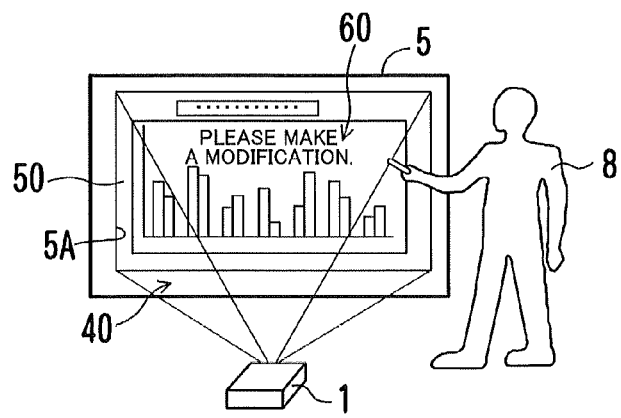
(A)
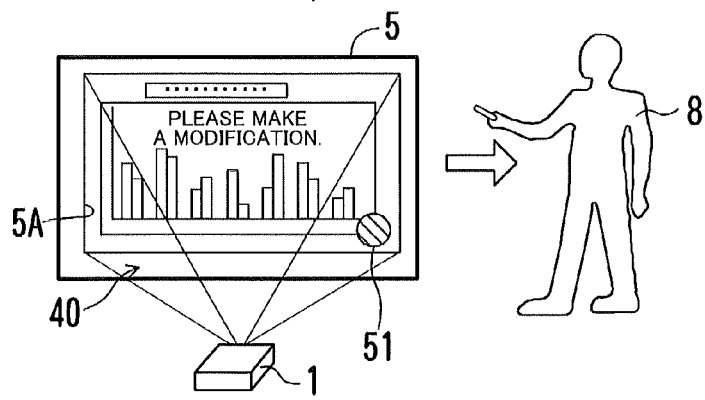
(B)
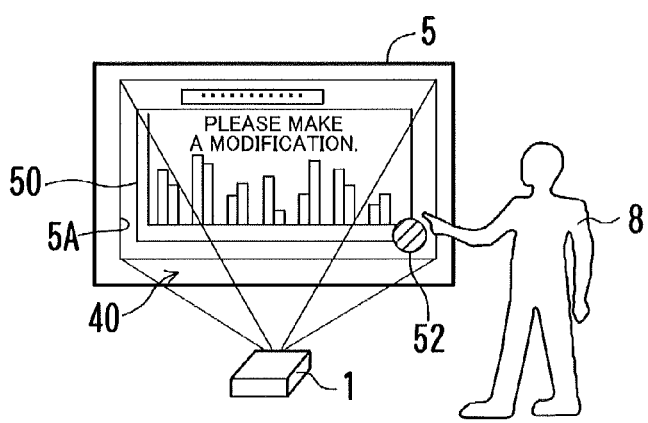
(C)
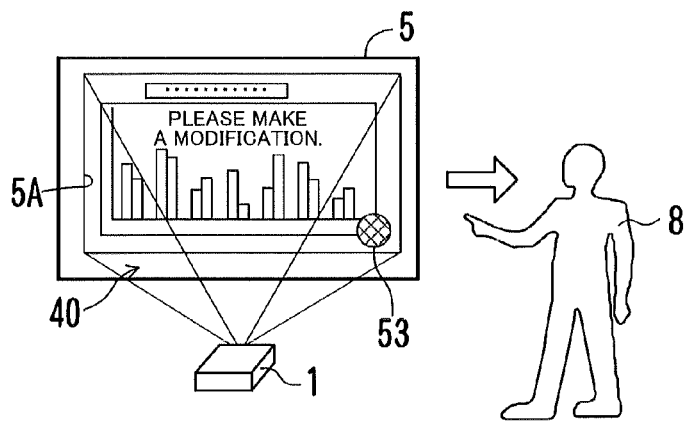
(D)

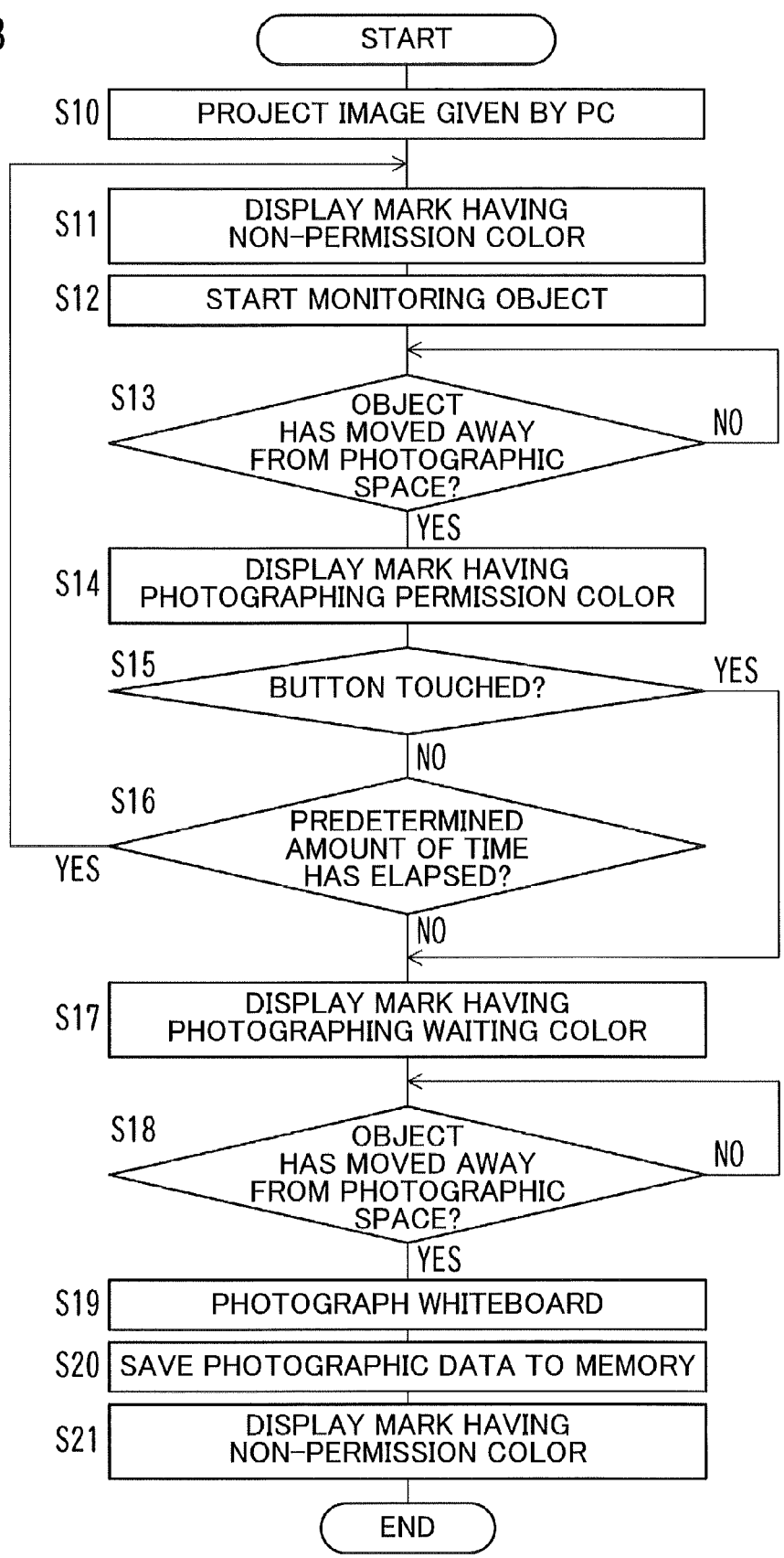

IMAGE DISPLAY AND PHOTOGRAPHING SYSTEM, PHOTOGRAPHING DEVICE, DISPLAY DEVICE, IMAGE DISPLAY AND PHOTOGRAPHING METHOD, AND COMPUTER-READABLE STORAGE MEDIUM FOR COMPUTER PROGRAM

This application is based on Japanese patent application No. 2014-097556 filed on May 9, 2014, the contents of which are hereby incorporated by reference.

BACKGROUND OF THE INVENTION

1. Field of the Invention

The present invention relates to a system for image display and photographing.

2. Description of the Related Art

Recent years have seen the widespread use of projectors which projects, onto a screen, an image displayed in a personal computer or smartphone. Such a projector is sometimes called an "image projection device".

The screen may be a whiteboard. The screen may be a white plastic sheet put on a wall. In such cases, a user may take a note on the screen with a pen while an image is projected onto the screen. The user may take a photo of the screen with a digital camera for recording.

There has been proposed a technology which allows a user to take a photo easily. According to the technology, a projector has a digital camera built therein, and a lens for projection to a liquid crystal projector and a lens for the digital camera are used in common. Thereby, both the projected light of the video by a personal computer outputted from the projector and the incident light of a synthetic image of the image handwritten by using a marker pen or the like on a whiteboard pass through the same lens. This eliminates, in importing the synthetic video of the video by the personal computer and the handwritten image to the personal computer, the need to adjust the position and size thereof (English abstract of Japanese Laid-open Patent Publication No. 2004-252118).

Another technology has been proposed for changing an image displayed at a time when a user touches a predetermined position in a display surface (Japanese Laid-open Patent Publication No. 2005-242725). Yet another technology has been proposed for controlling the driving of a projector. According to the technology, it is detected whether or not a human is present in a drawing region where a projector draws an image; and the driving of the projector is so controlled as to change an image or an image pattern plotted in the drawing area depending on whether or not the human is detected in the drawing region (Japanese Laid-open Patent Publication No. 2011-107237).

It is bothersome for a user to operate a button of a projector while making a presentation. This is because, during the presentation, the user is a little away from the projector. The user is often next to a screen during the presentation.

In view of this, it would be convenient to enter a command into the projector by doing something on the screen. It would be also convenient to enter a photographing command by doing something on the screen. For example, a button corresponding to the photographing command is displayed together with an image on the screen. In response to the button touched, a digital camera takes an image.

According to this method, unfortunately, a user's human body is sometimes photographed above the image.

SUMMARY

The present invention has been achieved in light of such an issue, and an object thereof is to photograph an image in such a manner that an object such as a user's human body does not overlap the image even when a photographing command is entered by operating a button displayed on a screen.

According to an aspect of the present invention, an image display and photographing system includes a display device configured to display a target image on a surface; a photographing device configured to photograph the surface; a first detector configured to detect that an object moves away from a space between the surface and the photographing device; a second detector configured to detect that, after the first detector detects that the object moves away from the space, the surface is touched at a predetermined position; a third detector configured to detect that, after the second detector detects that the surface is touched at the predetermined position, the object moves away from the space; and a photographing control portion configured to control, after the third detector detects that the object moves away from the space, the photographing device to photograph the surface.

These and other characteristics and objects of the present invention will become more apparent by the following descriptions of preferred embodiments with reference to drawings.

BRIEF DESCRIPTION OF THE DRAWINGS

FIG. 8 is a diagram showing a first example of operation of displaying a mark by a projector.

FIG. 9 is a diagram showing a second example of operation of displaying a mark by a projector.

FIG. 13 is a flowchart depicting an example of the flow of operation by a projector.

DESCRIPTION OF THE PREFERRED EMBODIMENTS

Figure 1:
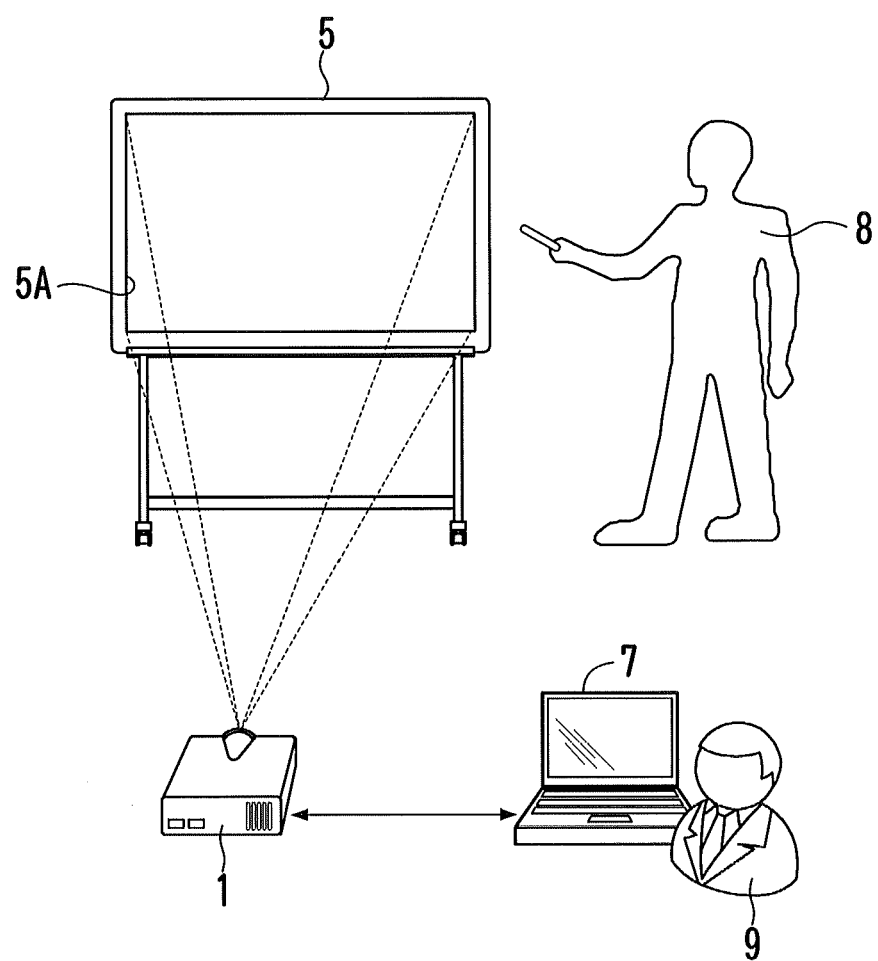
FIG. 1 is a diagram showing an example of how a projector according to an embodiment of the present invention is used.

Referring to FIG. 1, a projector 1 and a whiteboard 5 are used to make a presentation. The projector 1 is connected to a personal computer 7 operated by a presenter 8 or an assistant 9. The personal computer 7 gives data on an image to be projected and a projective instruction to the projector 1. The projector 1 follows the instruction from the personal computer 7 to project a target image onto the whiteboard 5 to be used as a screen (projection surface 5A).

Because the whiteboard 5 is used as the projection surface 5A, the presenter 8 may add supplemental information to a projected image or correct errors therein by writing the same onto the whiteboard 5 with a pen only for the whiteboard 5. The projector 1 according to this embodiment has a photographing function. The presenter 8 performs operation to cause the projector 1 to photograph the whiteboard 5, so that the handwritten contents can be recorded.

Figure 2:
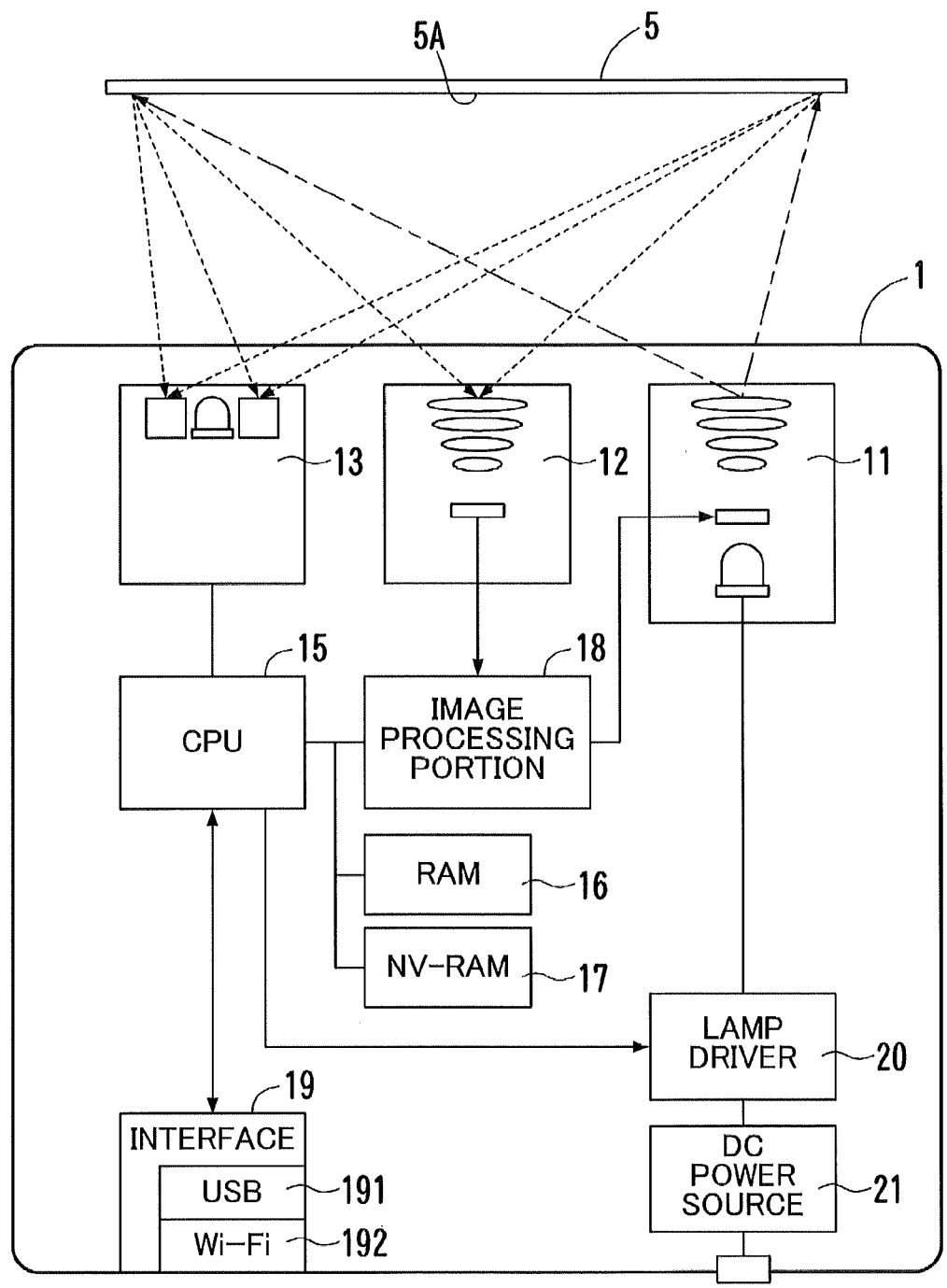
FIG. 2 is a block diagram showing an example of the hardware configuration of a projector.

FIG. 2 shows an example of the hardware configuration of the projector 1. The projector 1 is provided with a projection unit 11, a camera 12, an object sensor 13, a Central Processing Unit (CPU) 15, a Random Access Memory (RAM) 16, a non-volatile memory 17, an image processing portion 18, an interface 19, a lamp driver 20, a DC power source 21, and so on.

The projection unit 11 is a display means for displaying an image by projecting the image onto the projection surface 5A. The projection unit 11 includes a liquid crystal panel for displaying an image to be projected, a flood lamp provided in the back of the liquid crystal panel, and a group of lenses for forming an image on the projection surface. The DC power source 21 supplies power necessary for the flood lamp to emit light to the projection unit 11 through the lamp driver 20.

The camera 12 is a photographing means for taking an image of the projection surface 5A. The camera 12 has a two-dimensional image pickup device. The camera 12 outputs photographic data obtained by the image pickup device to the image processing portion 18. The camera 12 may be a scanner camera for obtaining a two-dimensional photographic image with a one-dimensional image pickup device and a scanning optical system.

The object sensor 13 is a distance measuring sensor for detecting the position of an object which is present between the projection surface 5A and the camera 12. The object sensor 13 includes a light-emitting device for emitting infrared rays, and two image pickup devices. The object sensor 13 outputs, to the CPU 15, data on two photographic images different in location of the eyepoint for distance measurement by using a triangulation method. Each of the image pickup devices has, on its light-receptive surface, a filter for infrared photography.

The CPU 15 loads a program for controlling the projector 1 from the non-volatile memory 17 into the RAM 16 to execute the program. The CPU 15 performs communication with the personal computer 7 through the interface 19 for communication with external devices. The CPU 15 controls the projector 1 to project an image in accordance with instructions from the personal computer 7. The CPU 15 also executes the variety of processing of displaying a mark on the projection surface 5A and of storing the photographic data captured by the camera 12 into the non-volatile memory 17. The processing is discussed later. The non-volatile memory 17 is, for example, a flash memory.

The image processing portion 18 expands, in a memory, a bitmapped image corresponding to the data sent by the personal computer 7 to display an image to be projected in the liquid crystal panel of the projection unit 11. The image processing portion 18 also performs processing for compressing the photographic data captured by the camera 12. The image processing portion 18 includes, for example, an Application Specific Integrated Circuit (ASIC).

The interface 19 has a USB portion 191 which enables wired communication meeting the Universal Serial Bus (USB) standards. The interface 19 also has a Wi-Fi portion 192 which enables wireless communication meeting the Wi-Fi standards.

The projector 1 has functions related to photographing by the camera 12, namely, a first function, a second function, and a third function.

The first function is to photograph the projection surface 5A with an object not appearing in the projection surface 5A. The first function is used when a handwritten content on the projection surface 5A by the presenter 8 is recorded. To be specific, the first function makes it possible to obtain photographic data showing the projection surface 5A having the handwritten content not hidden by the object, which is preferable in terms of recording.

The second function is to detect a touch, by an object, to a predetermined position in the projection surface 5A as user's instructions for photographing, namely, as entry of a photographing command. The second function makes it possible to provide the presenter 8 with an operational environment in which instructions for photographing are given to the projector 1 by touching the projection surface 5A. This makes the projector 1 convenient to use when the projector 1 is used for presentation.

The third function works when the projector 1 is ready to receive instructions for photographing. The third function is to display, on the projection surface 5A, a mark 51 showing that the projector 1 is ready to receive instructions for photographing. The third function makes it possible to provide the presenter 8 with an operational environment which enables the presenter 8 to easily know whether instructions for photographing can be given. This makes the projector 1 convenient to use when the projector 1 is used for presentation.

The description goes on to the configuration and operation of the projector 1, focusing on the first through third functions.

The projector 1 determines whether or not there is an object hiding the entirety or a part of the projection surface 5A with respect to the camera 12 in order that a photographic image may not contain an object. To be specific, the CPU 15 compares two photographic images obtained by the object sensor 13 to determine the parallax of a subject, then to calculate a distance from a photographing device to the subject. The CPU 15 then compares the calculated distance and a distance (known distance) to the whiteboard 5 which is stored in advance. The known distance may be measured in advance by the projector 1, or be entered by the user. If the calculated distance is shorter than the known distance, then the CPU 15 determines that there is an object. In other cases, the CPU 15 determines that there is no object.

Figure 3A:
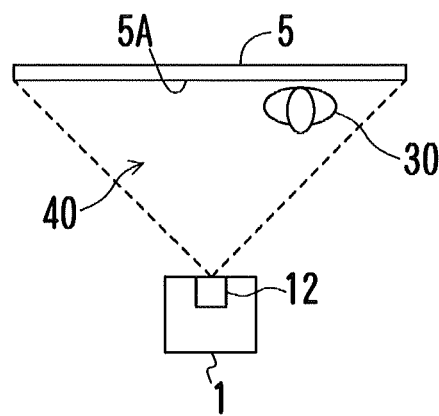
FIGS. 3A and 3B show examples of a positional relationship of an object and a space between a projector and a projection surface.
Figure 3B:
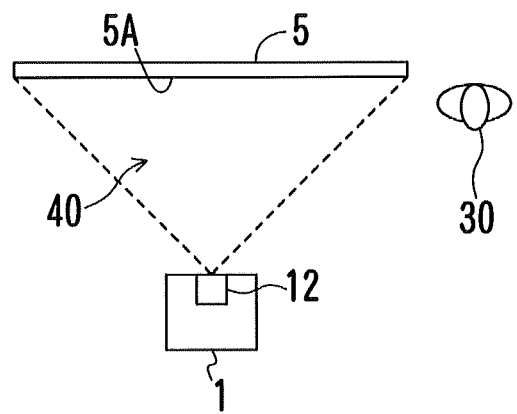

Referring to FIG. 3A, an object 30 is present within a part corresponding to a field of view of the camera 12 for photographing in a space between the projection surface 5A and the camera 12. The part is hereinafter referred to as a photographic space 40. In such a case, the projector 1 determines that the object 30 is present. Referring to FIG. 3B, the object 30 is present close to the whiteboard 5. The object 30 is however not present in the photographic space 40. In such a case, the projector 1 determines that the object 30 is not present.

The CPU 15 determines whether or not an object is present at regular intervals, e.g., of 1 through 3 seconds. If the result of latest determination (determination this time) is "object 30 not present", and if the result of the previous determination is "object 30 present", then the results show that the object 30 moves from within the photographic space 40 to outside the photographic space 40 between the previous determination and the determination this time. In other words, the results show that the object 30 moves away from the photographic space 40. As discussed later, the projector 1 photographs the projection surface 5A after the user gives instructions for photographing and the object 30 moves away from the photographic space 40.

Figure 4:
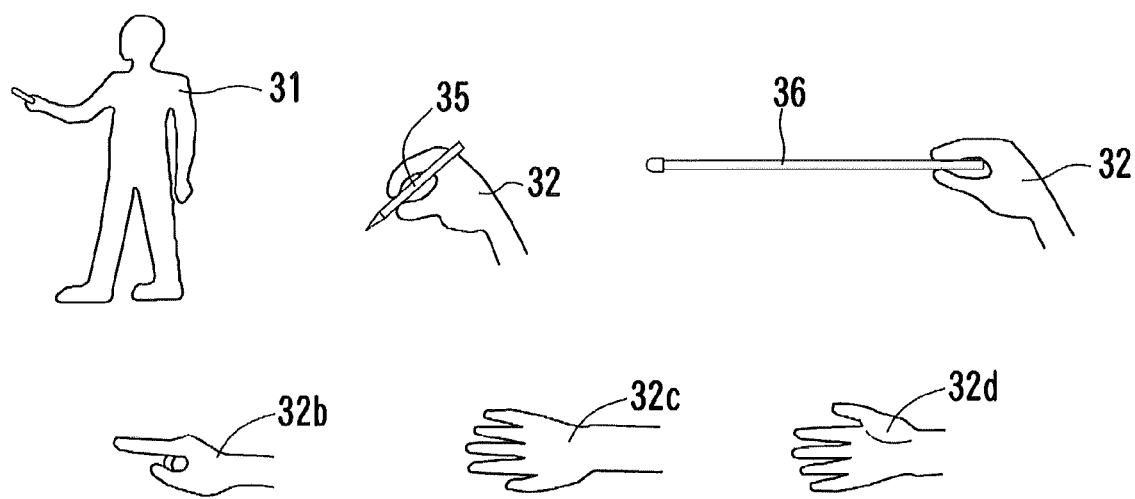
FIG. 4 is a diagram showing examples of an object detected as an object.

FIG. 4 shows examples of the object 30. While the presenter 8 makes a presentation with the projector 1, what moves into and out of the photographic space 40 is mostly limited to the presenter 8. In this embodiment, examples of the object 30 are: (1) a human body 31; (2) a pen 35 held in a hand 32; (3) a pointer 36 held in the hand 32; (4) a hand 32b pointing to somewhere; (5) a back of the hand 32c; and (6) a flat of the hand 32d.

Figure 5:
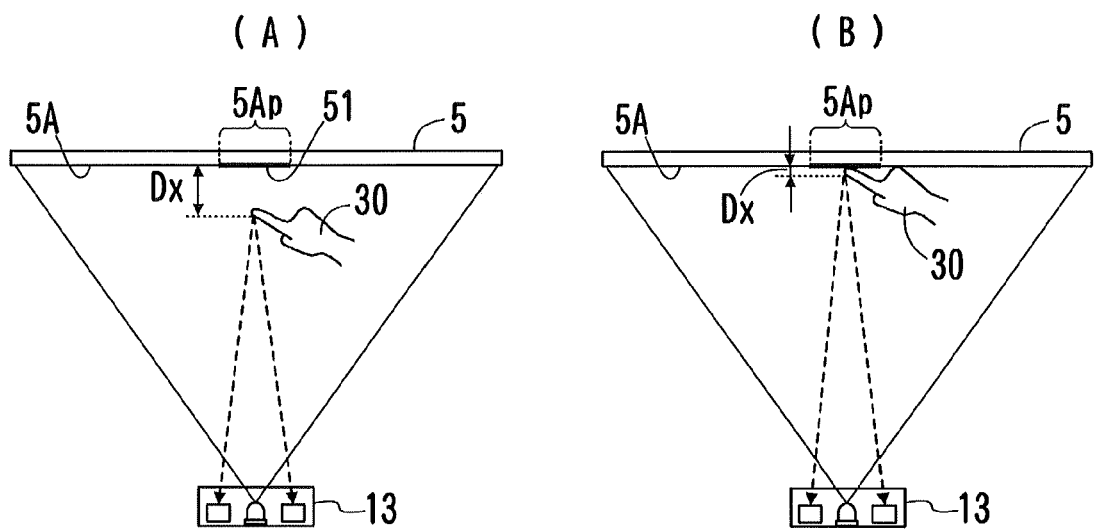
FIG. 5 is a diagram showing an example of a method for measuring a distance between a projection surface and an object.
Figure 6:
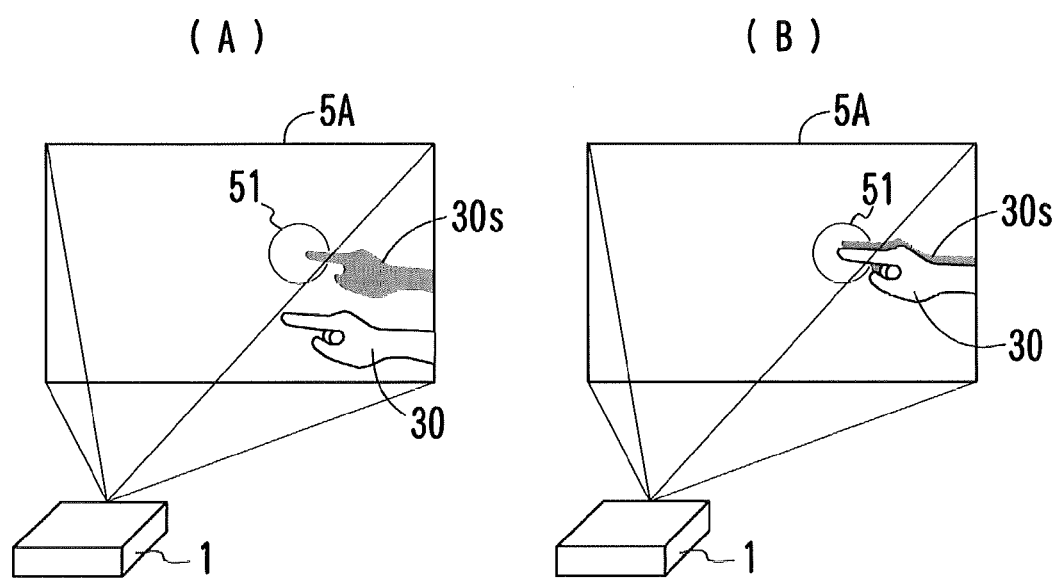
FIG. 6 is a diagram showing another example of a method for measuring a distance between a projection surface and an object.

Examples of a method for detecting a touch of the object 30 to a predetermined position of the projection surface 5A includes: a method by using the object sensor 13 as shown in FIG. 5; and a method by using a shadow 30s of the object 30 appearing in the projection surface 5A as shown in FIG. 6. In FIGS. 5 and 6, a predetermined position of the projection surface 5A is any position of a region 5Ap onto which the mark 51 is projected.

Referring to (A) of FIG. 5, the object 30 is away from the projection surface 5A. Referring to (B) of FIG. 5, the object 30 is in contact with the region 5Ap of the projection surface 5A. A so-called distance image is created based on the two photographic images having different locations of the eye-point obtained by the object sensor 13 to identify the position of the region 5Ap and the position of the object 30 in the three-dimensional space. If the object 30 overlaps the region 5Ap, and further, if a distance Dx between the object 30 and the region 5Ap is equal to or smaller than a threshold close to zero, e.g., 1-2 centimeters or so, then the projector 1 determines that the object 30 touches the predetermined position of the projection surface 5A.

Referring to (A) of FIG. 6, the object 30 is away from the projection surface 5A. Referring to (B) of FIG. 6, the object 30 is in contact with a part at which the mark 51 is projected onto the projection surface 5A. When the mark 51 is projected, the object 30 blocks light emitted from the projector 1, so that the shadow 30s having a shape corresponding to the object 30 appears on the projection surface 5A. Photographing the projection surface 5A in such a case obtains a two-dimensional photographic image having the mark 51, the object 30, and the shadow 30s contained therein.

The object 30 and the shadow 30s in the obtained two-dimensional photographic image are shifted from each other in position depending on a distance between the actual object 30 and the actual projection surface 5A. If an amount of the shift in position is equal to or smaller than a threshold close to zero (equal to or smaller than the number of pixels corresponding to the actual distance of, for example, 1-2 centimeters or so), and further, if the object 30 overlaps the mark 51 in the photographic image, then the projector 1 determines that the object 30 is in contact with the predetermined position of the projection surface 5A.

Figure 7:
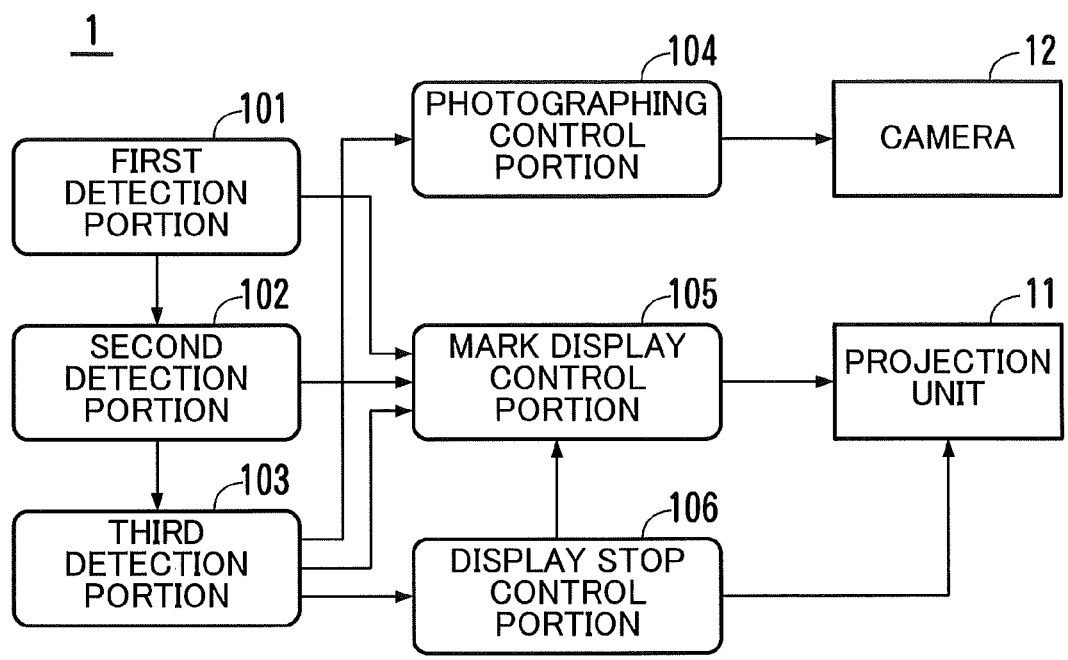
FIG. 7 is a block diagram showing an example of the functional configuration of a projector.

FIG. 7 shows an example of the functional configuration of the projector 1. The projector 1 is configured of a first detection portion 101, a second detection portion 102, a third detection portion 103, a photographing control portion 104, a mark display control portion 105, a display stop control portion 106, and so on. The portions are the functional elements implemented in response to the program executed by the CPU 15.

The first detection portion 101 detects that the object 30 moves away from the photographic space 40 by, as described above, determining whether or not the object 30 is present in the photographic space 40 at regular intervals. Every time determining whether or not the object 30 is present therein, the first detection portion 101 identifies the position of the object 30 in the photographic space 40. Based on the change in position of the object 30, the first detection portion 101 detects a direction to which the object 30 moves away from the photographic space 40, i.e., the direction of movement of the object 30 away from the photographic space 40.

After the first detection portion 101 detects that the object 30 moves away from the photographic space 40, the second detection portion 102 detects that the object 30 touches a predetermined position of the projection surface 5A by, for example, making the distance measurement as shown in FIG. 5.

After the second detection portion 102 detects that the object 30 touches the predetermined position of the projection surface 5A, the third detection portion 103 detects that the object 30 moves away from the photographic space 40 by, as with the first detection portion 101, determining whether or not the object 30 is present in the photographic space 40 at regular intervals.

After the third detection portion 103 detects that the object 30 moves away from the photographic space 40, the photographing control portion 104 controls the camera 12 to take an image of the projection surface 5A.

The mark display control portion 105 controls the projection unit 11 to display any of marks related to photographing by the camera 12 in response to the presenter 8 moving into/out of the photographic space 40 as discussed later.

When the presenter 8 or another user selects a projection stop mode in which projection is stopped while the camera 12 takes an image, the display stop control portion 106 controls the projection unit 11 to stop displaying an image during a period from when the third detection portion 103 detects that the object 30 moves away from the photographic space 40 to when the camera 12 takes an image of the projection surface 5A.

FIG. 8 shows a first example of operation of displaying a mark by the projector 1. FIG. 9 shows a second example of operation of displaying a mark by the projector 1. In the first and second examples, it is supposed that the presenter 8 writes a content on the whiteboard 5 by hand, and the projector 1 photographs the handwritten content. The projector 1 displays marks 51, 52, 53, and 54 related to photographing in the following manner in accordance with the change in position of the presenter 8 as the object 30.

Referring to (A) of FIG. 8, the image 50 provided by the personal computer 7 is projected onto the whiteboard 5. The illustrated image 50 is a bar graph. FIG. 8 shows, in (A), that the presenter 8 has finished writing, by hand, the character string 60 "please make a modification." on the whiteboard 5 with the image 50 projected.

At this point in time of (A) of FIG. 8, a part of the right arm of the presenter 8 is present in the photographic space 40. In such a case, the projector 1 displays the mark 54 above the image 50. The mark 54 has a non-permission color (red color, for example) defined as a color showing a state in which the photographing control portion 104 does not permit the camera 12 to take an image. The mark 54 is displayed for the purpose of letting the presenter 8 know that he/she has to move away from the photographic space 40 in order to instruct the projector 1 to photograph.

After the mark 54 is displayed as shown in (A) of FIG. 8, the presenter 8 moves away from the photographic space 40 as shown in (B) of FIG. 8. The first detection portion 101 detects the movement of the presenter 8. The mark display control portion 105 receives a notice of the detection. The mark display control portion 105 controls the projection unit 11 to finish displaying the mark 54 and to display the mark 51 having a photographing permission color, e.g., green color. The photographing permission color is defined as a color showing a state in which the photographing control portion 104 permits the camera 12 to take an image.

The mark 51 is displayed in the form of a button used for the presenter 8 to instruct the projector 1 to photograph. In short, the presenter 8 is capable of instructing photographing by touching a part of the whiteboard 5 at which the mark 51 is projected.

The mark 51 is displayed until a predetermined amount of time (one minute, for example) has elapsed since display of the mark 51 was started. While the mark 51 is displayed, the presenter 8 is allowed to instruct the projector 1 to photograph.

FIG. 8 shows, in (C), a situation immediately after the presenter 8 touches, with the right hand, the part of the whiteboard 5 at which the mark 51 is projected onto the projection surface 5A. In the illustrated example, the right hand which has touched the part is away from the projection surface 5A, but is still in the photographic space 40.

The second detection portion 102 detects the touch to the part at which the mark 51 is projected onto the projection surface 5A. When being informed of the detection, the mark display control portion 105 controls the projection unit 11 in such a manner that the display of the mark 51 is finished, and instead, the mark 52 having a photographing waiting color (blue, for example) is displayed. The photographing waiting color is defined as a color showing a state in which the photographing control portion 104 waits for the third detection portion 103 to detect that the presenter 8 moves away from the photographic space 40. The mark 52 is displayed in (C) of FIG. 8.

The mark 52 is displayed in order to prompt the presenter 8 to move away from the photographic space 40, which prevents the presenter 8 from appearing in the photographic image.

The presenter 8 moves away from the photographic space 40 after the display of the mark 52, which is detected by the third detection portion 103. When being informed of the detection, the photographing control portion 104 controls the camera 12 to take an image of the projection surface 5A. In this way, the photographic image containing the image 50 and the handwritten character string 60 is recorded.

From when the photographing control portion 104 instructs the camera 12 to take an image to when photographic data obtained through the photographing is completely saved to the non-volatile memory 17, the mark display control portion 105 controls the projection unit 11 to display a mark 53 having a color, e.g., yellow, defined as a color showing a state in which photographing is currently conducted as shown in (D) of FIG. 8.

After the photographic data is completely saved, when at least a part of the human body of the presenter 8 moves into the photographic space 40, the mark 54 is displayed as with the case of (A) of FIG. 8.

The first example discussed above may be modified as follows: When the camera 12 takes an image of the projection surface 5A with the projection stop mode selected, it is possible not to display the mark 53. Alternatively, the display stop control portion 106 may control the projection unit 11 to display the mark 53 and not to display the image 50. Yet alternatively, at the time of photographing, the display stop control portion 106 controls the projection unit 11 to stop projecting light, and to photograph the whiteboard 5 on which only the handwritten character string 60 as information appears and none of the image 50 and the mark 53 appears.

Unlike the first example shown in FIG. 8, according to the second example shown in FIG. 9, the mark 54 is not displayed, which is clear from the comparison between (A) of FIG. 8 and (A) of FIG. 9. Except for the difference, the second example is the same as the first example. FIG. 9 shows, in (B)-(D), the same situations as those in (B)-(D) of FIG. 8, respectively. Referring to (B)-(D) of FIG. 9, the marks 51, 52, and 53 are displayed in the second example as with the first example.

The second example may be modified as follows: The mark 54 can be displayed only for approximately 1-3 seconds after the display of the mark 53 having a color showing a state in which photographing is being conducted. As with the modification to the first example, when the camera 12 takes an image of the projection surface 5A with the projection stop mode selected, the display stop control portion 106 may control the projection unit 11 to stop projecting one or both of the mark 53 and the image 50.

Figure 10:
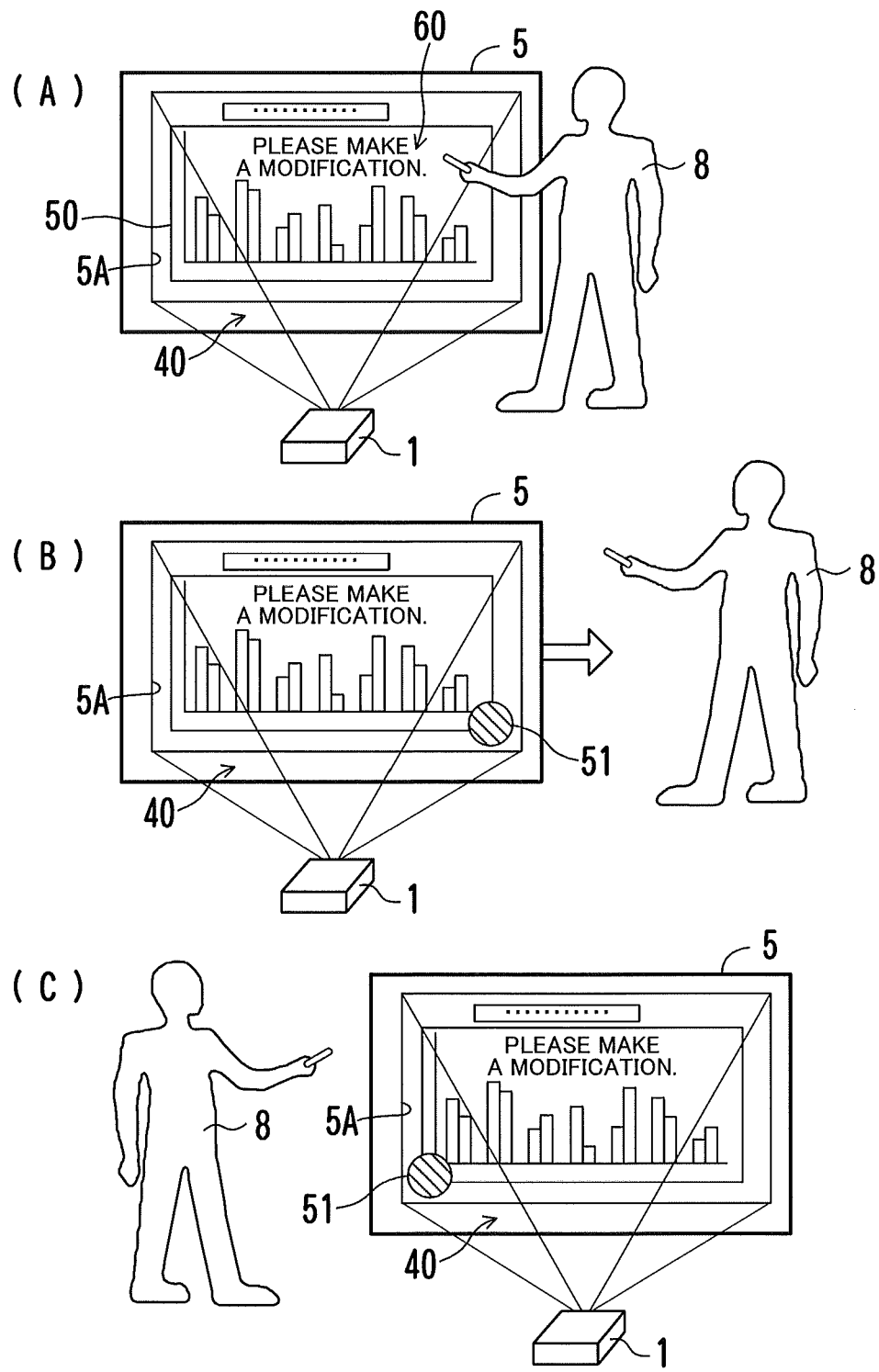
FIG. 10 is a diagram showing an example of operation for changing the display position of a button in accordance with the movement direction of an object.

FIG. 10 shows an example of operation for changing the display position of the mark 51, functioning as a button for the presenter 8 to instruct photographing, in accordance with the movement direction of the presenter 8.

Referring to (A) of FIG. 10, the presenter 8 writes the character string 60 by hand, and stands close to the whiteboard 5. A part of the right arm of the presenter 8 is in the photographic space 40.

When the presenter 8 moves away from the photographic space 40 to the right as shown in FIG. 10, from the state of (A) to the state of (B), the mark display control portion 105 controls the projection unit 11 to display the mark 51 in the right end which is the front end of the projection surface 5A in the movement direction of the presenter 8.

On the other hand, when the presenter 8 moves away from the photographic space 40 to the left as shown in FIG. 10, from the state of (A) to the state of (C), the mark display control portion 105 controls the projection unit 11 to display the mark 51 in the left end of the projection surface 5A. In such a case, the left end of the projection surface 5A corresponds to the front end of the projection surface 5A in the movement direction of the presenter 8.

In order to determine at which end, right and left, of the projection surface 5A the mark 51 is to be displayed, the mark display control portion 105 obtains, from the first detection portion 101, the movement direction detected thereby as discussed above. If the obtained movement direction is the direction from left to right, then the mark display control portion 105 displays the mark 51 in the right end of the projection surface 5A. If the obtained movement direction is the direction from right to left, then the mark display control portion 105 displays the mark 51 in the left end of the projection surface 5A.

As the result of detection of the movement direction by the first detection portion 101, the mark display control portion 105 may obtain, from the first detection portion 101, a position (last position) immediately before the presenter 8 moves away from the photographic space 40 to determine whether the mark 51 is to be displayed in the left or right of the projection surface 5A depending on the last position. If the last position is located in the right half of the photographic space 40, then the movement direction of the presenter 8 is determined to be the direction from left to right. The mark display control portion 105 therefore determines that the mark 51 is to be displayed in the right end of the projection surface 5A. In contrast, if the last position is located in the left half of the photographic space 40, then the movement direction of the presenter 8 is determined to be the direction from right to left. The mark display control portion 105 therefore determines that the mark 51 is to be displayed in the left end of the projection surface 5A.

In any case, as shown in FIG. 10, the mark 51 is displayed at a position close to the presenter 8 who has moved away from the photographic space 40. This enables the presenter 8 to touch the mark 51 (button) quickly, and after touching the same, to move away from the photographic space 40 quickly.

The description goes on to a method for displaying any of the marks 51, 52, 53, and 54 selectively above the image 50.

Figure 11:
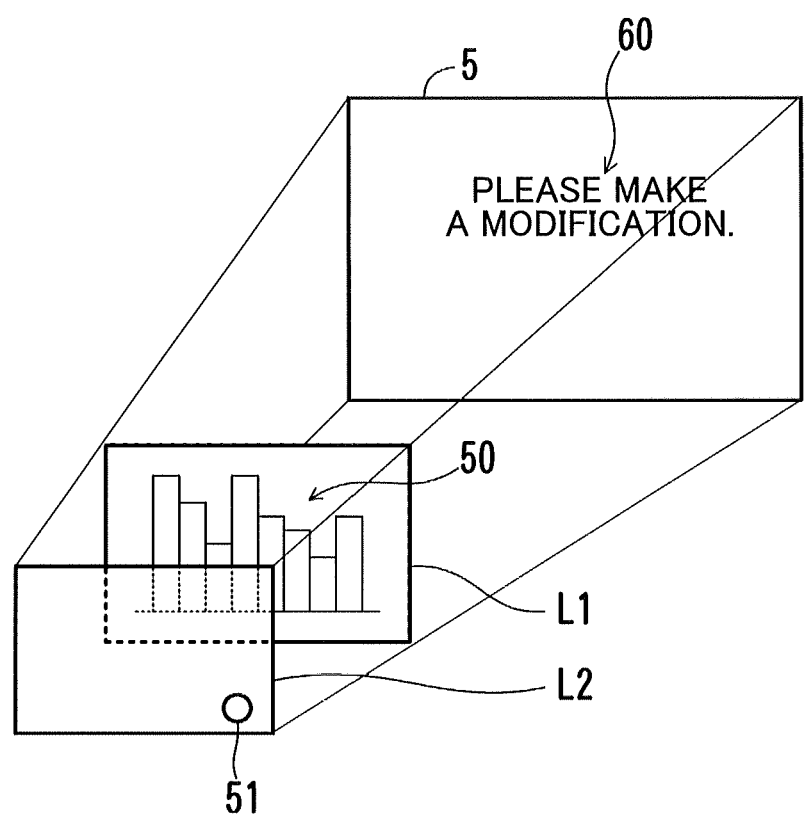
FIG. 11 is a diagram showing an example of the construction of an image projected by a projector.

FIG. 11 shows an example of the construction of an image projected by the projector 1. The image processing portion 18 controls the projection unit 11 to project an image combined by overlaying two layers L1 and L2 on each other. The layer L1 is to draw the image 50 given by the personal computer 7. The layer L2 is to draw a photographing-related mark. In the illustrated example, the mark 51 is drawn in the layer L2.

The use of the two layers L1 and L2 allows the mark 51, 52, 53, or 54 to be displayed with the image 50, remaining displayed. Only the mark may be projected by making the layer L1 blank.

Figure 12A:
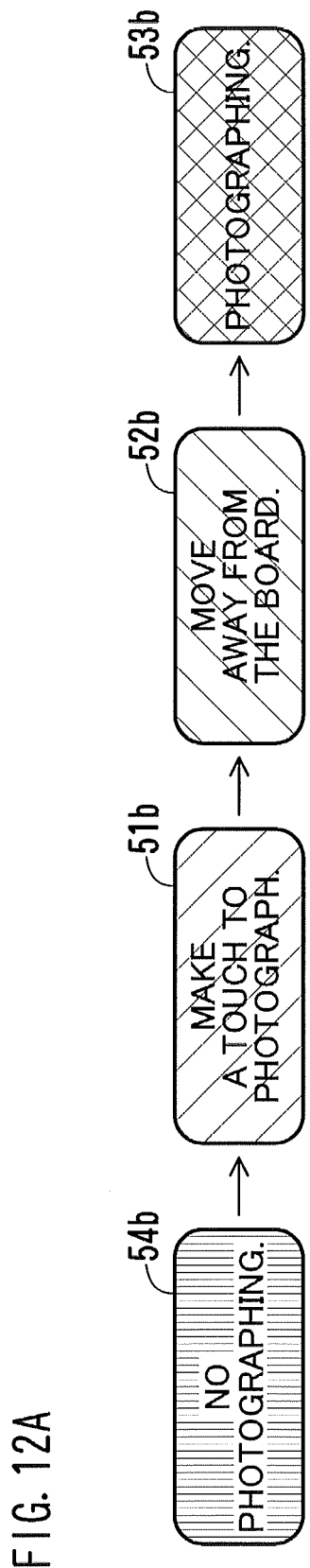
FIGS. 12A and 12B are diagrams showing a variation of the style of a mark related to photographing.

A modification to the style of the photographing-related mark is described below. As discussed above, FIGS. 8 and 9 show examples in which the marks 51, 52, 53, and 54 have colors different from one another. The present invention, however, is not limited to the examples. As shown in FIG. 12A, it is possible to display marks 54b, 51b, 52b, and 53b having a character string indicating what kind of situation the corresponding mark is displayed. The marks 54b, 51b, 52b, and 53b of FIG. 12A have character strings and colors different from one another. Instead of such a character string, a state may be displayed by using a graphic designed as a symbol. The mark has any shape of circle, triangle, rectangle, or star.

Figure 12B:
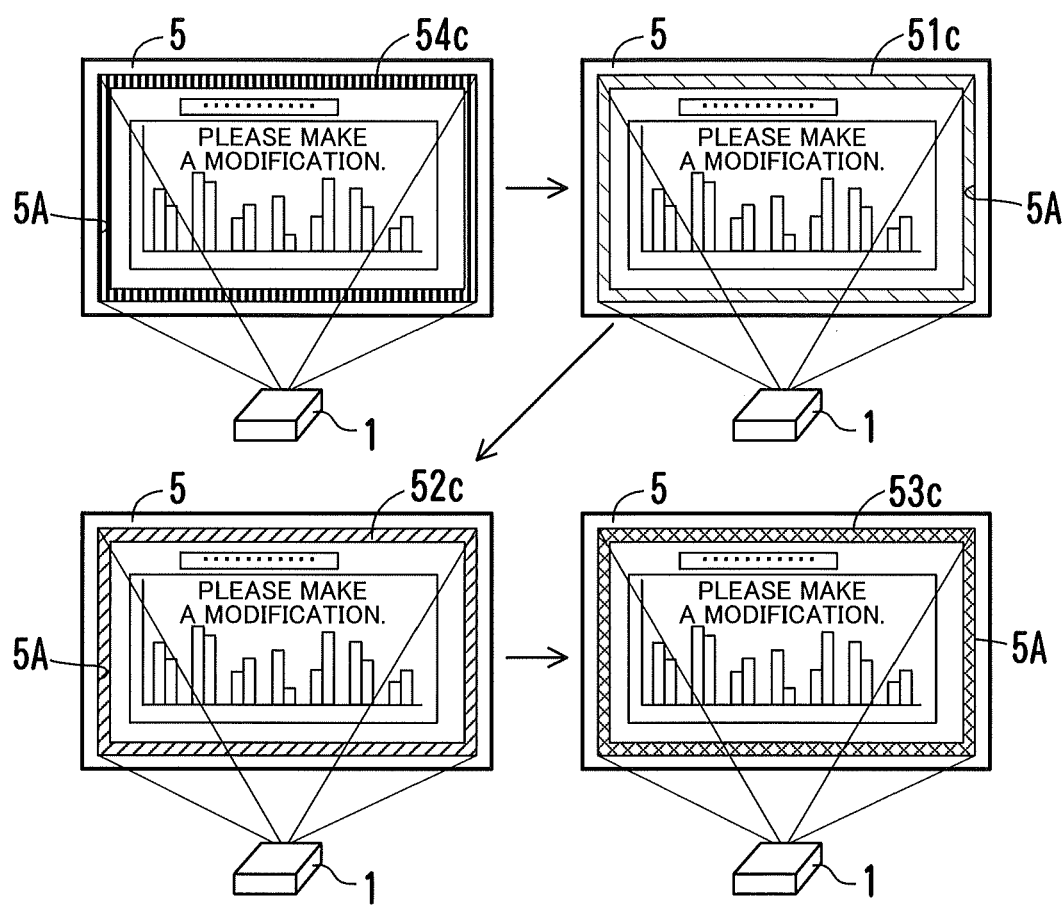

Alternatively, as shown in FIG. 12B, it is possible to display marks 51c, 52c, 53c, and 54c having a frame-like shape corresponding to the periphery of the projection surface 5A. In such a case, the marks 51c, 52c, 53c, and 54c have different colors, patterns, thicknesses, or line types from one another. This allows the presenter 8 to distinguish between the marks 51c, 52c, 53c, and 54c. In the example of FIG. 12B, the marks 51c, 52c, 53c, and 54c have different colors from one another.

The frame-like mark 51c shows a state in which photographing can be instructed by touching the frame-like mark 51c. When the mark 51c is displayed, the entire area including the mark 51c and the projection surface 5A surrounded thereby may be used as a button for the presenter 8 to instruct photographing. In such a case, the presenter 8 can instruct the projector 1 to photograph by touching any position in the projection surface 5A.

The foregoing description is summarized with reference to the flowchart of FIG. 13.

The projector 1 projects the image 50 given by the personal computer (PC) 7 onto the whiteboard 5 (Step S10).

The mark display control portion 105 controls the projection unit 11 to display the mark 54 having a non-permission color (Step S11). However, in the mode of not displaying the mark 54 as shown in the example of FIG. 9, the process in Step S11 is bypassed.

Each of the first detection portion 101, the second detection portion 102, and the third detection portion 103 starts monitoring an object, specifically, starts processing of detecting the movement of the object 30 in the photographic space 40 based on the output from the object sensor 13 (Step S12).

When the first detection portion 101 detects that the object 30 moves away from the photographic space 40 (YES in Step S13), the mark display control portion 105 controls the projection unit 11 to display, as an operational button for instructing photographing, the mark 51 having a photographing permission color (Step S14).

When the second detection portion 102 detects a touch, by the object 30, to a position in a region of the projection surface 5A where the mark 51 as the button is displayed (YES in Step S15), the mark display control portion 105 controls the projection unit 11 to display the mark 52 having a photographing waiting color (Step S17).

When a predetermined amount of time elapses without a touch, by the object 30, to a position in the region where the mark 51 is displayed (NO in Step S15, and YES in Step S16), the processing returns to Step S11. In such a case, the mark display control portion 105 controls the projection unit 11 to finish displaying the mark 52, and thereafter, controls the projection unit 11 to display the mark 54 in Step S11.

When the second detection portion 102 has detected the touch to the position in Step S15, and the third detection portion 103 detects that the object 30 moves away from the photographic space 40 (YES in Step S18), the photographing control portion 104 controls the camera 12 to take an image of the whiteboard 5 (Step S19). The photographing control portion 104 then saves the obtained photographic data to the non-volatile memory 17 (Step S20).

From when the photographing control portion 104 instructs the camera 12 to take an image to when the photographic data is completely saved, in other words, to when the camera 12 is ready for the next photographing (Step S19 and Step S20), the mark display control portion 105 may control the projection unit 11 to display the mark 53 having a color showing the state in which photographing is being conducted.

After the save of the photographic data, the mark display control portion 105 controls the projection unit 11 to display the mark 54 having a non-permission color (Step S21). After that, in a case where the mark 54 is displayed only for a short time after photographing as shown in the example of FIG. 9, the mark display control portion 105 controls the projection unit 11 to finish displaying the mark 54 at a time when a predetermined short time has elapsed.

The projection stop mode related to projection by the projection unit 11 while the camera 12 takes an image come in the following three options: Displaying only the mark 53; displaying only the image 50; and displaying none of the mark 53 and the image 50. Independently of whether or not the image 50 is displayed, when the mark 53 is not displayed, the mark display control portion 105 controls the projection unit 11 not to display the mark 53 in Step S19. When the image 50 is not displayed, the display stop control portion 106 controls the projection unit 11 not to display the image 50 immediately before Step S19, and controls the projection unit 11 to display the image 50 immediately after Step S20.

The foregoing embodiments enable photographing of an image with the object 30 such as a user's human body not overlapping an image even when a photographing command is entered through user's action on a button (mark 51) displayed on the screen.

In the foregoing embodiments, the projector 1 is exemplified in which the projection unit 11 and the camera 12 are integral with each other. The present invention is not limited thereto, and is also applicable to a case shown in FIG. 14 where a display means for projecting an image is provided in a device independently of a device having a photographing means for photographing a projection surface.

Figure 14:
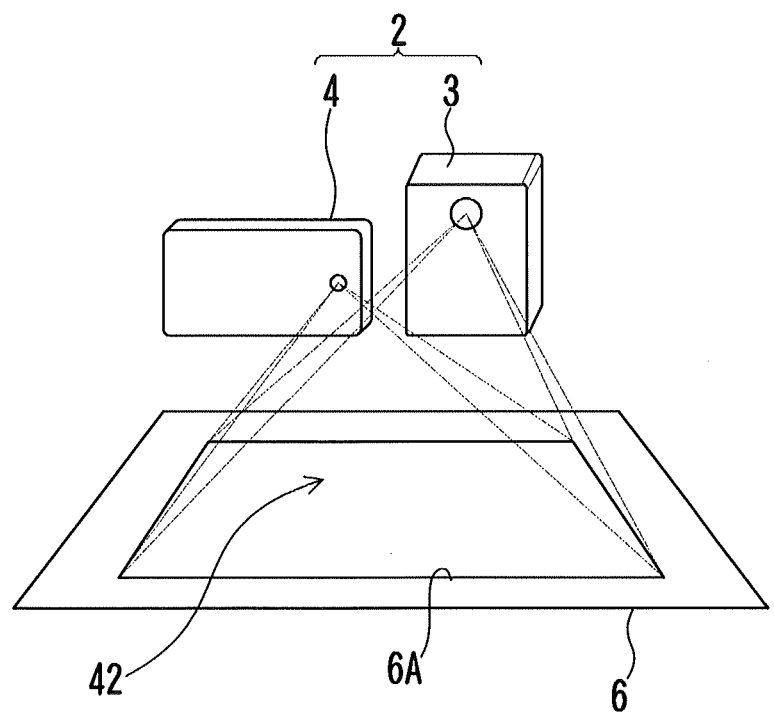
FIG. 14 is a diagram showing a variation of the system configuration.

Referring to FIG. 14, a system 2 for projection and photographing is provided with a portable projector 3 and a portable information terminal 4 having a camera (photographing means). The information terminal 4 is, for example, a smartphone. The projector 3 projects an image onto, for example, paper 6 used as a writable screen placed on a desk. The information terminal 4 photographs the paper 6. The projector 3 and the information terminal 4 are so positioned that the entire area of a projection surface 6A may be photographed.

As with the projector 1, the system 2 monitors movement of an object in and out of a part corresponding to field of view for photographing (referred to as a photographic space 42) of a space between the projection surface 6A and the camera of the information terminal 4. The system 2 then controls the camera of the information terminal 4 to photograph the projection surface 6A so as to prevent the object from appearing in the photographic image. Stated differently, the system 2 has functional elements similar to the first detection portion 101, the second detection portion 102, the third detection portion 103, the photographing control portion 104, the mark display control portion 105, and the display stop control portion 106, all of which are shown in in FIG. 7.

The information terminal 4 or the projector 3 may be configured to provide all of the first detection portion 101, the second detection portion 102, the third detection portion 103, the photographing control portion 104, the mark display control portion 105, and the display stop control portion 106. Alternatively, the following configuration is also possible: The information terminal 4 is so configured to provide some of the first detection portion 101, the second detection portion 102, the third detection portion 103, the photographing control portion 104, the mark display control portion 105, and the display stop control portion 106, and the projector 3 is so configured to provide the other functional portions.

For example, the information terminal 4 may include a functional element to display a mark in the projector 3 as an operational guide or a button for a user of the system 2 to instruct photographing, and a functional element to detect that the object moves away from the photographic space 42 and to detect a touch to a position where the mark is displayed. The projector 3 may include a functional element to control the projector 3 to photograph the projection surface 6A when the information terminal 4 detects that the object moves away from the photographic space 42 after the position where the mark is displayed is touched.

Another configuration is also possible in which a determination as to whether or not the object is present in the photographic space 40 or 42 is made through image recognition based on the photographic image of the projection surface 5A or 6A photographed by the camera 12 or the camera of the information terminal 4.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image display and photographing system comprising:
   a display device configured to display a target image on a surface;
   a photographing device configured to photograph the surface;
   a first detector configured to detect that an object moves away from a space between the surface and the photographing device;
   a second detector configured to detect that, after the first detector detects that the object moves away from the space, the surface is touched at a predetermined position;
   a third detector configured to detect that, after the second detector detects that the surface is touched at the predetermined position, the object moves away from the space; and
   a photographing control portion configured to control, after the third detector detects that the object moves away from the space, the photographing device to photograph the surface.

2. The image display and photographing system according to claim 1, comprising a mark display control portion configured to control the display device to display the target image and, as a photographing-related mark, a first mark during a period after the first detector detects that the object moves away from the space until the second detector detects that the surface is touched at the predetermined position, a second mark during a period after the second detector detects that the surface is touched at the predetermined position until the third detector detects that the object moves away from the space, and a third mark after the third detector detects that the object moves away from the space; wherein
   the predetermined position is a position at which the first mark is displayed.

3. The image display and photographing system according to claim 2, wherein the first mark, the second mark, and the third mark are images of buttons having a style different from one another.

4. The image display and photographing system according to claim 3, wherein the mark display control portion controls the display device to display the target image and, as the photographing-related mark, a fourth mark that is an image of a button different in style from each of the first mark, the second mark, and the third mark during a period after the target image is displayed until the first detector detects that the object moves away from the space, and the fourth mark after the photographing device photographs the surface.

5. The image display and photographing system according to claim 2, wherein
   the first detector further detects a direction in the surface to which the object moves away from the space, and the mark display control portion controls the display device to display the first mark in an end of the target image along the direction.

6. The image display and photographing system according to claim 2, wherein the first mark, the second mark, and the third mark are images surrounding the target image, and are different in color.

7. The image display and photographing system according to claim 2, comprising a display stop control portion configured to control, after the third mark is displayed, the display device to stop displaying the target image and the third mark during a period immediately before the photographing device photographs the surface until the photographing device photographs the surface.

8. The image display and photographing system according to claim 1, comprising a mark display control portion configured to control the display device to display the target image and, as a photographing-related mark to surround the target image, a first frame during a period after the first detector detects that the object moves away from the space until the second detector detects that the surface is touched at the predetermined position, a second frame during a period after the second detector detects that the surface is touched at the predetermined position until the third detector detects that the object moves away from the space, and a third frame after the third detector detects that the object moves away from the space; wherein
the predetermined position is a position at which the target image is displayed.

9. The image display and photographing system according to claim 1, comprising a display stop control portion configured to control the display device to stop displaying the target image during a period after the third detector detects that the object moves away from the space until the photographing device photographs the surface.

10. A photographing device used together with a display device for displaying a target image on a surface, the photographing device comprising:
a photographing portion configured to photograph the surface;
a first detector configured to detect that an object moves away from a space between the surface and the photographing portion;
a second detector configured to detect that, after the first detector detects that the object moves away from the space, the surface is touched at a predetermined position;
a third detector configured to detect that, after the second detector detects that the surface is touched at the predetermined position, the object moves away from the space; and
a photographing control portion configured to control, after the third detector detects that the object moves away from the space, the photographing portion to photograph the surface.

11. A display device used together with a photographing device, the display device comprising:
a display portion configured to display a target image on a surface;
a first detector configured to detect that an object moves away from a space between the surface and the photographing device;
a second detector configured to detect that, after the first detector detects that the object moves away from the space, the surface is touched at a predetermined position;
a third detector configured to detect that, after the second detector detects that the surface is touched at a predetermined position, the object moves away from the space; and
a photographing control portion configured to control, after the third detector detects that the object moves away from the space, the photographing device to photograph the surface.

12. An image display and photographing method using a display device for displaying a target image on a surface and a photographing device for photographing the surface, the method comprising:
a first step of detecting that an object moves away from a space between the surface and the photographing device;
a second step of detecting that, after it is detected in the first step that the object moves away from the space, the surface is touched at a predetermined position;
a third step of detecting that, after it is detected in the second step that the surface is touched at the predetermined position, the object moves away from the space; and
a fourth step of controlling, after it is detected in the third step that the object moves away from the space, the photographing device to photograph the surface.

13. A non-transitory computer-readable storage medium storing thereon a computer program used in a computer, the computer including a display device for displaying a target image on a surface and a photographing device for photographing the surface, the computer program causing the computer to execute processing comprising:
first processing of detecting that an object moves away from a space between the surface and the photographing device;
second processing of detecting that, after it is detected in the first processing that the object moves away from the space, the surface is touched at a predetermined position;
third processing of detecting that, after it is detected in the second processing that the surface is touched at the predetermined position, the object moves away from the space; and
fourth processing of controlling, after it is detected in the third processing that the object moves away from the space, the photographing device to photograph the surface.

14. A non-transitory computer-readable storage medium storing thereon a computer program used in a computer, the computer being used together with a display device for displaying a target image on a surface and a photographing device for photographing the surface, the computer program causing the computer to execute processing comprising:
first processing of detecting that an object moves away from a space between the surface and the photographing device;
second processing of detecting that, after it is detected in the first processing that the object moves away from the space, the surface is touched at a predetermined position;
third processing of detecting that, after it is detected in the second processing that the surface is touched at the predetermined position, the object moves away from the space; and
fourth processing of controlling, after it is detected in the third processing that the object moves away from the space, the photographing device to photograph the surface.

* * * * *